March 10, 1959  L. L. FUNK  2,877,046
AUTOMOBILE ELEVATABLE FINS

Filed Oct. 24, 1957  3 Sheets-Sheet 1

INVENTOR.
LOUIS L. FUNK
BY Herbert Q. Winters,
ATTORNEY

March 10, 1959     L. L. FUNK     2,877,046
AUTOMOBILE ELEVATABLE FINS

Filed Oct. 24, 1957     3 Sheets-Sheet 2

INVENTOR.
LOUIS L. FUNK
BY Herbert A. Minturn
ATTORNEY

March 10, 1959 — L. L. FUNK — 2,877,046
AUTOMOBILE ELEVATABLE FINS
Filed Oct. 24, 1957 — 3 Sheets—Sheet 3

INVENTOR.
LOUIS L. FUNK
BY Herbert Q. Winters
ATTORNEY

United States Patent Office 2,877,046
Patented Mar. 10, 1959

2,877,046

AUTOMOBILE ELEVATABLE FINS

Louis L. Funk, Indianapolis, Ind.

Application October 24, 1957, Serial No. 692,070

3 Claims. (Cl. 296—1)

This invention relates to an automobile and particularly to fender fins serving initially as ornamental means in dressing up the car primarily indicating a long sweep effect. Specifically, the present invention relates to fins which may be elevated either under increasing speed of the automobile or under power control as may be desired.

By providing for means of elevating the fins above the normal contour of the automobile fenders, particularly the rear fenders, a noticeable change in appearance of the automobile may be had, and furthermore under higher speeds, an increase in stability of the automobile may be had.

These and many other objects and advantages of the invention will become apparent in the following description as illustrated in the accompanying drawings, in which Fig. 1 is a view in top plan of the rear portion of an automobile and in partial section;

Figure 1:
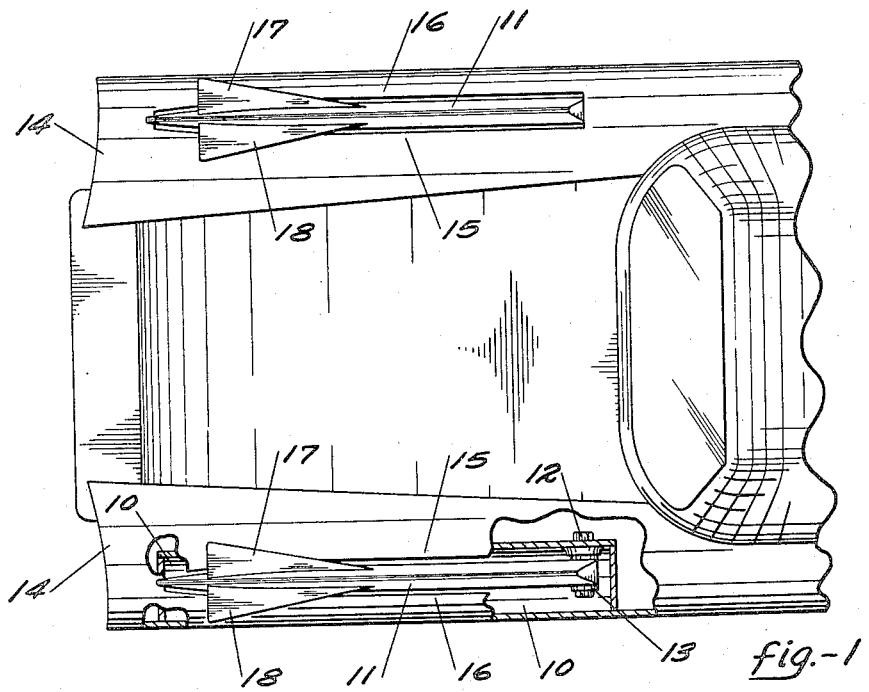
Figure 2:
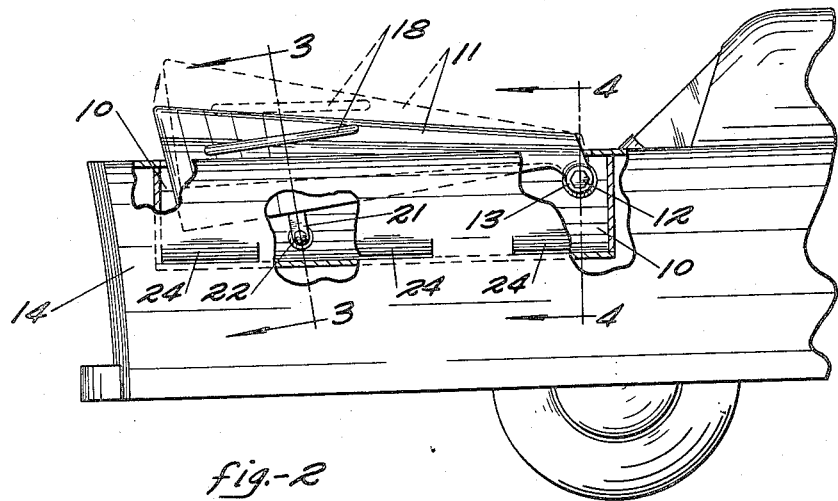
Fig. 2 is a view in side elevation of that portion also in partial section.
Figure 3:
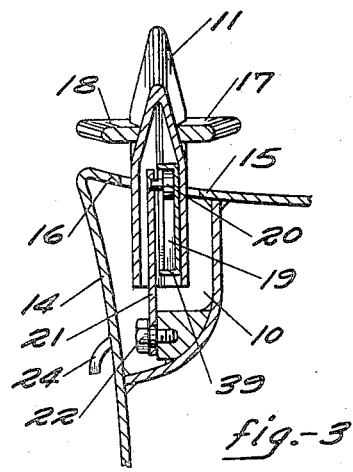
Fig. 3 is a detail in transverse section on the line 3—3 in Fig. 2.
Figure 4:
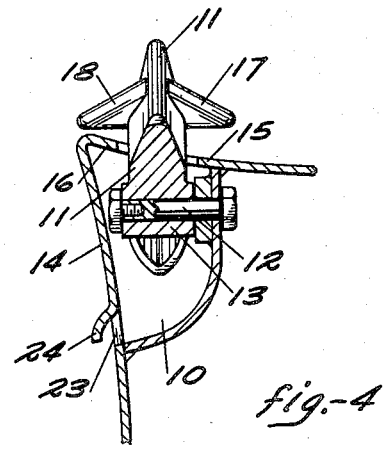
Fig. 4 is a detail in vertical section on the line 4—4 in Fig. 2.
Figure 5:
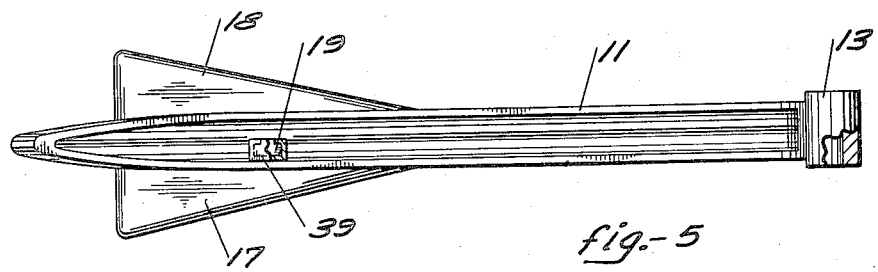
Fig. 5 is a view in bottom plan of an elevatable fin apart from the fender.
Figure 6:
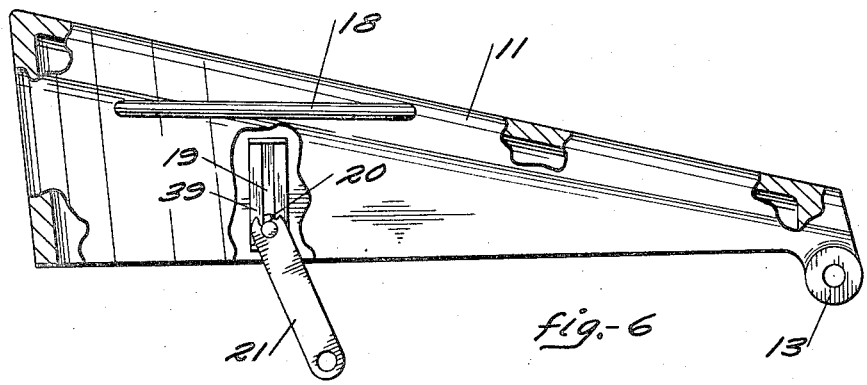
Fig. 6 is a view in side elevation and partial section of the fender fin.

Referring to Figs. 1–6, the usual fender construction is had with exception that there is a fin receptacle in the nature of a box 10 provided in the upper portion of the fender opening from the topside thereof. Within this box or well 10, there is rockably mounted a fin 11 by any suitable means, such as by a bolt 12 at the forward end of the well 10, passing through an ear 13 of the fin 11.

It is to be understood that each of the rear fenders 14 is thus provided with a fin 11 extending substantially the fore and aft length of the well 10. These fins 11 are relatively narrow in transverse width, and the upper portion of each fender 14 extends inwardly by the portions 15 and 16 to come into close proximity to the sides of the fin 11, defining a fin slot.

Normally these fins 11 may drop downwardly by their rear portions to be approximately at the same elevations of the portions 15 and 16.

Each fin 11 may be provided with laterally extending elevators 17 and 18 herein shown as being triangular in top plan view, Fig. 1. These elevators 17 and 18 are fixed to the sides of the fin 11 at the rear portion thereof, with the wider end of the elevators disposed toward the rear end of the fin. The elevators 17 and 18 are so disposed on the sides of the fin 11 to have their forward and outer edges inclined slightly upwardly from the horizontal so that when the automobile is driven forwardly, the wind pressure against the undersides of the elevators 17 and 18 will tend to elevate the fins 11 by their rear ends to some such position as indicated by the dash lines in Fig. 2.

In order to stabilize the fins 11 laterally of the fenders, each fin 11 is provided with a T-slot 19 within a bracket 39 extending substantially vertically, within which is carried a roller 20 rotatably connecting with a link 21 at an upper end thereof, and the link 21 in turn is rockably mounted on a lower cap-screw or bolt 22 fixed in the lower portion of the well 10. The rocking of the link 21 is provided to permit it to accommodate itself to the arc of swinging of the fin about the bolt 12 in the various positions of the fin. Normally the well 10 will be drained by providing an outlet such as at 23 under a louver 24 to prevent build-up of water within the well 10.

The description so far made applies to the automatically lifting fin operating under differential of the speed of the automobile, increasing speed causing the fin 11 in each instance to lift higher until the elevators 17 and 18 are in substantial parallelism with the direction of travel. These fins 11 may be power lifted and lowered if so desired independently of reaction thereon by wind pressure.

Figure 7:
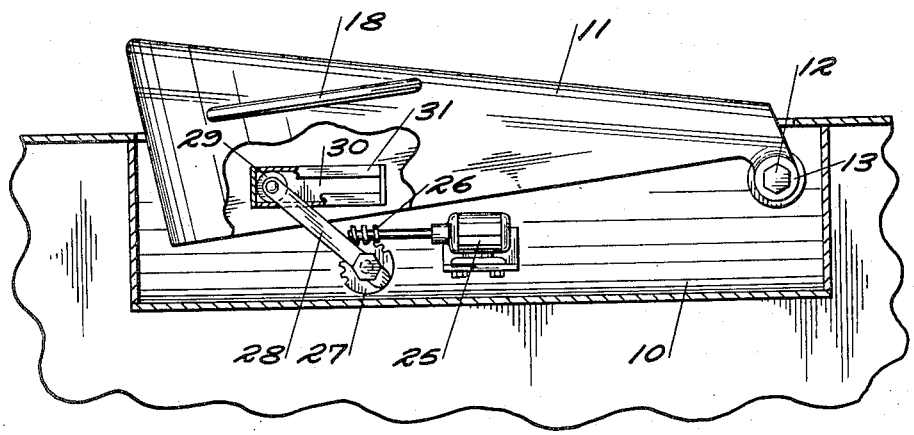
Fig. 7 is a view in side elevation and partial section of a power control applied to the elevatable fin.

Referring to Fig. 7, a structure is shown whereby an electric motor 25 is mounted, herein shown as within the well 10 to drive through a worm 26 a worm wheel 27 to which is fixed a rock lever 28 in turn carrying a roller 29 within a T-slot 30 provided in the bracket 31 fixed to the fin 11. The T-slot 30 preferably extends substantially horizontally so that the rock arm 28 rocked under influence of drive from the motor 25 will tend to lift the fin 11 in one direction of travel and lower it in an opposite direction. The elevators 17 and 18 may be omitted if desired, although they may be retained without any appreciable limitation on the power drive.

Figure 8:
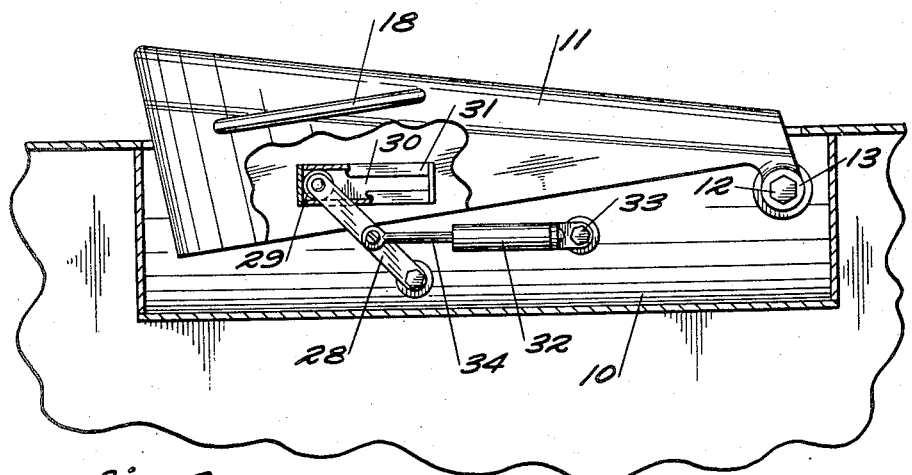
Fig. 8 is a like view in side elevation and partial section of a power mechanism of a hydraulic nature applied to the fender fin.

The drive may be of a hydraulic nature as is suggested in Fig. 8 where a hydraulic motor 32 is shown rockably mounted on a bolt 33 in the well 10, and connecting by a piston rod 34 with the rock lever 28 carrying a roller 29 within the T-slot 30 provided in the bracket 31. By actuating the motor 32, the rock lever 28 may be shifted forwardly or rearwardly and thus lift and lower the fin 11.

While I have herein shown and described my invention in the particular forms, it is obvious that structural variations may be employed without departing from the spirit of the invention, and I therefore do not desire to be limited to those precise forms beyond the limitations which may be imposed by the following claims.

I claim:

1. The combination with a fixed fender portion of an automobile, of a fin extensible from the upper side of the fender; said fender having a slot extending longitudinally thereof; means rockably mounting a forward end of the fin below said slot providing for travel of the fin upwardly and downwardly through said slot; an elevator disposed rearwardly of said rockably mounting means and projecting laterally from said fin above said slot gradually lifting the fin by air pressure against the elevator to a maximum height when said elevator is in substantial parallelism with the direction of travel.

2. The structure of claim 1 in which there is an enclosed well under said slot receiving the lower portion of said fin therein; and said rockable mounting means being in said well.

3. The combination with a fixed body portion of an automobile, of a rockable fin variably extensible upwardly therefrom; said body portion having an upper opening therein receiving therethrough the major portion of the fin when lowered; means hinging the forward end portion of the fin to said body portion; and rearwardly disposed elevator means on said fin gradually rocking said fin about its forward hinging means upon air pressure thereagainst produced by differential speeds of the automobile.

References Cited in the file of this patent
UNITED STATES PATENTS

| | | |
|---|---|---|
| 2,559,827 | Northrop | July 10, 1951 |

FOREIGN PATENTS

| | | |
|---|---|---|
| 1,118,420 | France | Mar. 19, 1956 |
| 1,058,987 | France | Nov. 10, 1953 |